United States Patent [19]
Lewton, Jr.

[11] Patent Number: 5,794,997
[45] Date of Patent: Aug. 18, 1998

[54] CRANKSHAFT MANIPULATION DEVICE

[76] Inventor: Fred L. Lewton, Jr., 245 Cheyenne Rd., Virginia Beach, Va. 23462

[21] Appl. No.: 680,965

[22] Filed: Jul. 16, 1996

[51] Int. Cl.$^6$ .............................. B25B 27/14; B65G 7/12
[52] U.S. Cl. .................................. 294/15; 29/278
[58] Field of Search ................... 294/1.1, 15–17, 294/19.1, 26, 67.1, 67.5, 81.5; 16/114 R; 29/270, 278, 283; 81/176.15, 488; 269/3

[56] References Cited

U.S. PATENT DOCUMENTS

| | | |
|---|---|---|
| 1,448,999 | 3/1923 | Haarberg . |
| 1,529,518 | 3/1925 | Voeller . |
| 1,532,150 | 4/1925 | Olson ................. 294/1.1 X |
| 1,535,022 | 4/1925 | Jenkins ............. 294/81.5 X |
| 1,538,867 | 5/1925 | Garvin ................. 294/1.1 X |
| 1,635,259 | 7/1927 | Critchley . |
| 1,675,812 | 7/1928 | Loyd . |
| 2,193,054 | 3/1940 | Bowen . |
| 2,456,917 | 12/1948 | Cheek . |
| 2,503,426 | 4/1950 | Tower ................. 29/283 |
| 2,606,054 | 8/1952 | Cole . |
| 2,681,821 | 6/1954 | Medders ................. 294/1.1 |
| 3,137,064 | 6/1964 | Pearl et al. ................. 29/270 |
| 3,643,991 | 2/1972 | Eaton . |
| 3,701,558 | 10/1972 | Baker . |
| 4,645,224 | 2/1987 | Poganski . |
| 4,794,683 | 1/1989 | Pacheco ................. 29/278 |
| 5,303,966 | 4/1994 | Robinson . |
| 5,468,034 | 11/1995 | Kopel . |

*Primary Examiner*—Johnny D. Cherry
*Attorney, Agent, or Firm*—John F. Carroll, IV

[57] ABSTRACT

A tool having a pair of similar devices for the installation, manipulation and removal of crankshafts of internal combustion engines. Each device is made of two major components: a threaded stud having a retaining collar and a handle assembly, which is attachable to the threaded stud. Each of the handle assemblies includes a rod with a certain length, a first end and a second end. The first end of each rod is attached to a handle. The length of each rod is such that, upon assembly of the tool, the first ends of the rods are equidistant from an axis of rotation of the crankshaft within the engine block. The second end of each rod forms a hole capable of receiving a stud threadably engaged in a crankshaft. The tool is designed to be used with each stud threadably engaged with a crankshaft and with each handle assembly placed over its respective stud, up to the collar of the stud, with a retainer threadably engaged with the stud so as to confine the handle assembly to the stud.

20 Claims, 3 Drawing Sheets

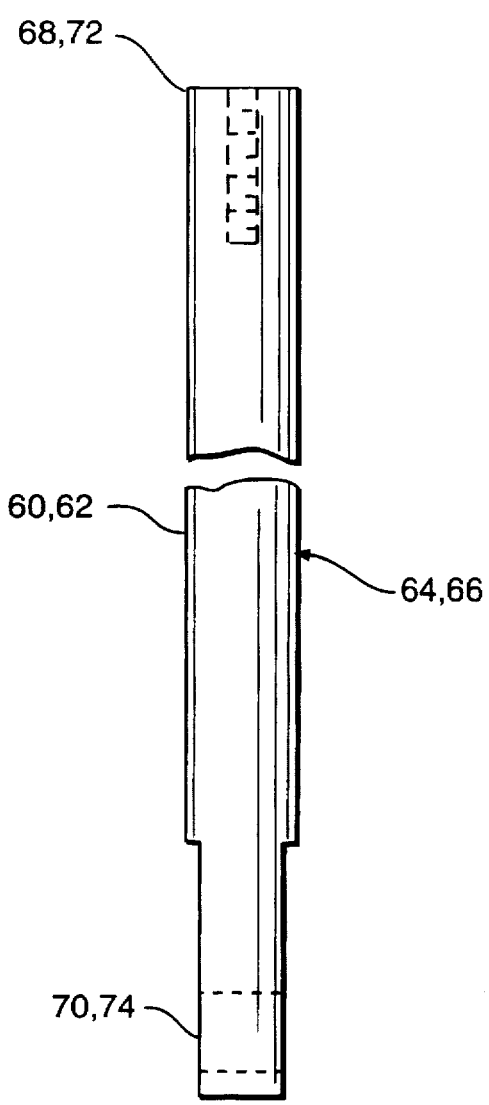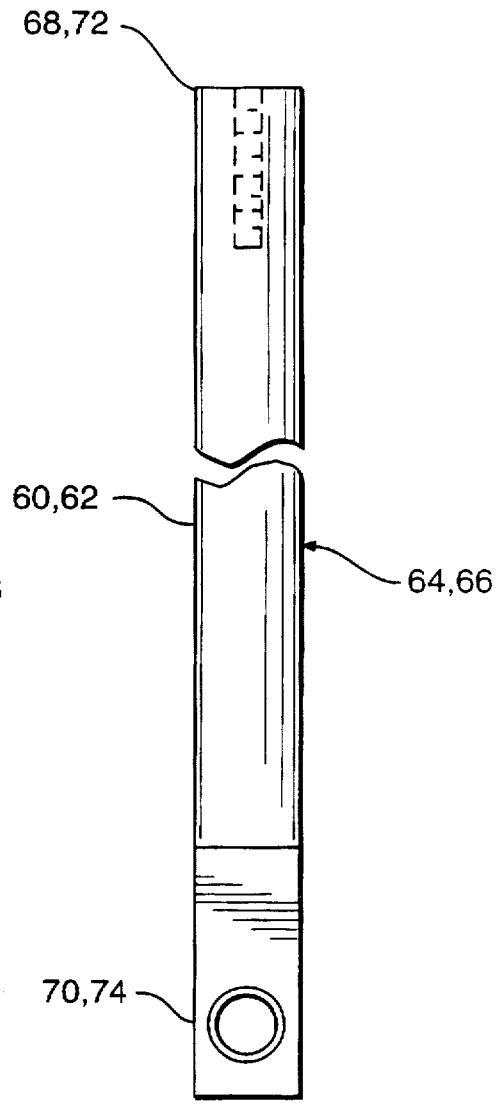
FIG. 2   FIG. 3

5,794,997

CRANKSHAFT MANIPULATION DEVICE

BACKGROUND

Crankshafts are those shafts with eccentrically mounted lobes found in internal combustion engines that are part of an assembly of four-bar linkages designed to convert linear reciprocating energy to rotational energy. Such a four-bar linkage in an internal combustion engine is made of a piston rotatably joined to a connecting rod rotatably joined to a crankshaft rotatably joined to a mechanical ground known as the engine block. The piston is slidably engaged so that it may move in a reciprocating fashion within a cylinder which is also mechanically grounded to the engine block. This assembly of piston, connecting rod, crankshaft and engine ground is commonly known as a "slider-crank" mechanism.

As the piston of a slider-crank mechanism is forced to slide reciprocally within a cylinder, the attached connecting rod performs work on the crank. Transmission of energy in this manner, through one or many of such linkages attached to such a shaft, causes the shaft to rotate within bearings attached to the engine block. This shaft is then able to provide rotational energy that is available to power a generator, a transmission, or some other device requiring a rotational energy source.

In order to maximize the amount of energy transmitted through such linkage systems, and in order to minimize energy losses, tolerances within these linkage systems are quite fine, particularly in those systems found in automotive internal combustion engines. Specifically, the tolerances between a crankshaft and engine block bearings are typically on the order of ±0.0005 inches.

When these clearances degrade through wear, either the crankshaft or the engine block bearings, or perhaps both, must be serviced or replaced. Access to this portion of an internal combustion engine is provided by removing the oil pan covering attached to the lower portion of the engine block as well as the head of the engine block and disconnecting the rods that attach the pistons to the crankshaft.

Unfortunately for those who service crankshafts and engine bearings, crankshafts are designed for efficient translation of linear energy to rotational energy and not for ease of installation, manipulation or removal. Since there are very few, if any, handholds available on these slick, lubricated shafts, crankshafts can easily be dropped during removal, transportation or installation. Dropping a crankshaft very often causes it to bend beyond its dimensional tolerance or causes impact or abrasion damage to an otherwise friction minimized surface. Also, if the crankshaft is dropped while over the engine block, damage can result to other components of the engine.

Additionally, once placed within an engine block, a crankshaft must be manipulated to properly fit it within the engine block bearings. Since crankshafts are quite bulky and lack any defined handhold, and since gripping tools cannot be used directly on the friction-minimizing surfaces that make up most of the readily accessible surface of crankshafts, manipulation is quite difficult.

It is an object of the present invention to provide a device in the form of a tool suitable for the installation, removal and carrying of a crankshaft.

It is a further object of the present invention to provide a device suitable for the manipulation of an automotive crankshaft while placed within an engine block.

It is a still further object of the present invention to provide a crankshaft tool that can be used by one person in a variety of applications.

It is a still further object of the present invention to provide a crankshaft tool that is easy to manufacture out of high quality materials and relatively inexpensive.

It is a still further object of the present invention to provide a crankshaft tool in kit form.

These and other objects and advantages of the present invention will become apparent from a reading of the attached description, drawings and appended claims.

SUMMARY

The present invention is a device suitable for the installation, removal, carrying of a crankshaft and a device suitable for the manipulation of an automotive crankshaft within an engine block. The device of the present invention includes a means for engaging a crankshaft and a means for removably gripping the crankshaft engaging means. The removable gripping means can include a plurality of handle assemblies capable of being placed on the engaging means and a plurality of means for removably retaining the handle assemblies on the engaging means. Each of the handle assemblies can include a rod with an attached handle. The length of each rod can be such that upon assembly, the handles are capable of lying in a line parallel to a line formed by rotation of the crankshaft within the engine block.

Each of the removable retaining means can include a fastener forming an internal, threaded hole capable of receiving a stud. Each removable retaining means can also include: a knob with a threaded hole along its axis capable of receiving a stud and a threaded hole along its radius capable of receiving a set screw; and a set screw threadably engagable within the knob. Each knob can be knurled.

The engaging means can include a plurality of threaded studs having a first end and a middle. The middle portion of each threaded stud can be smooth. A retaining collar can be located between the first end and the middle of each stud.

DRAWINGS

A preferred embodiment of the present invention will be described in greater detail with reference to the accompanying drawings, wherein like elements bear like reference numerals and where:

FIG. 2 shows a front view of a rod comprising a portion of the invention of FIG. 1;

FIG. 3 shows a side view of a rod comprising a portion of the invention of FIG. 1;

DESCRIPTION

Figure 1:
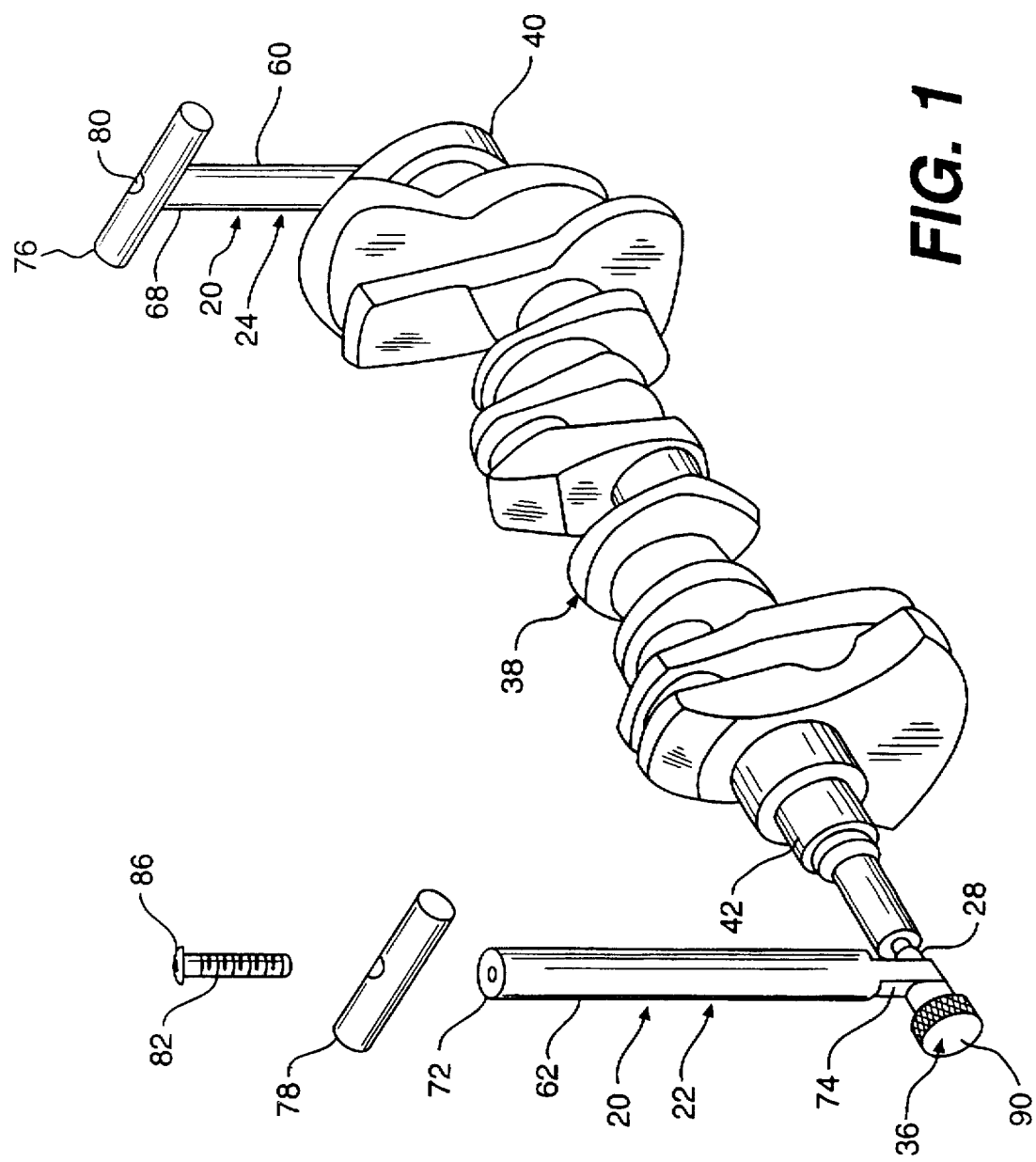
FIG. 1 shows a partially exploded perspective view of crankshaft installation tool according to an embodiment of the present invention.

Shown in FIGS. 1–5 is an embodiment of a crankshaft manipulation tool 20 comprising a pair of similar devices 22, 24. Each device 22, 24 is made of three major components: a stud having a means for engaging a crankshaft 26, 28, a handle assembly 30, 32 removably attached to the stud 26, 28, and a means for retaining the handle assembly 34, 36 attached to the stud 26, 28. Each of the devices 22, 24 is used in combination as follows: a stud 26, 28 is engaged in a crankshaft 38 and a handle assembly 30, 32 is removably attached to the stud 26, 28 with the retaining means 34, 36.

When used in pairs, the devices form a tool 20 that assists in the manipulation, insertion, removal and carrying of a crankshaft 38.

Automotive crankshafts have one end that is commonly referred to as a "flywheel end" 40, due to its proximity to the flywheel that is typically attached to crankshafts, and a second end, distal from the flywheel end, that is commonly known as a "snout end" 42, named for the snub shape of the crankshaft 38 at that point. Both the flywheel end 40 and the snout end 42 are typically designed with internal, threaded holes that run parallel to the line of rotation of the crankshaft 38. The studs 26, 28 that comprise a portion of this embodiment of the present invention take advantage of the threaded holes in the ends 40, 42 of crankshaft 38 and engage the crankshaft 38 at these points.

Figure 4:
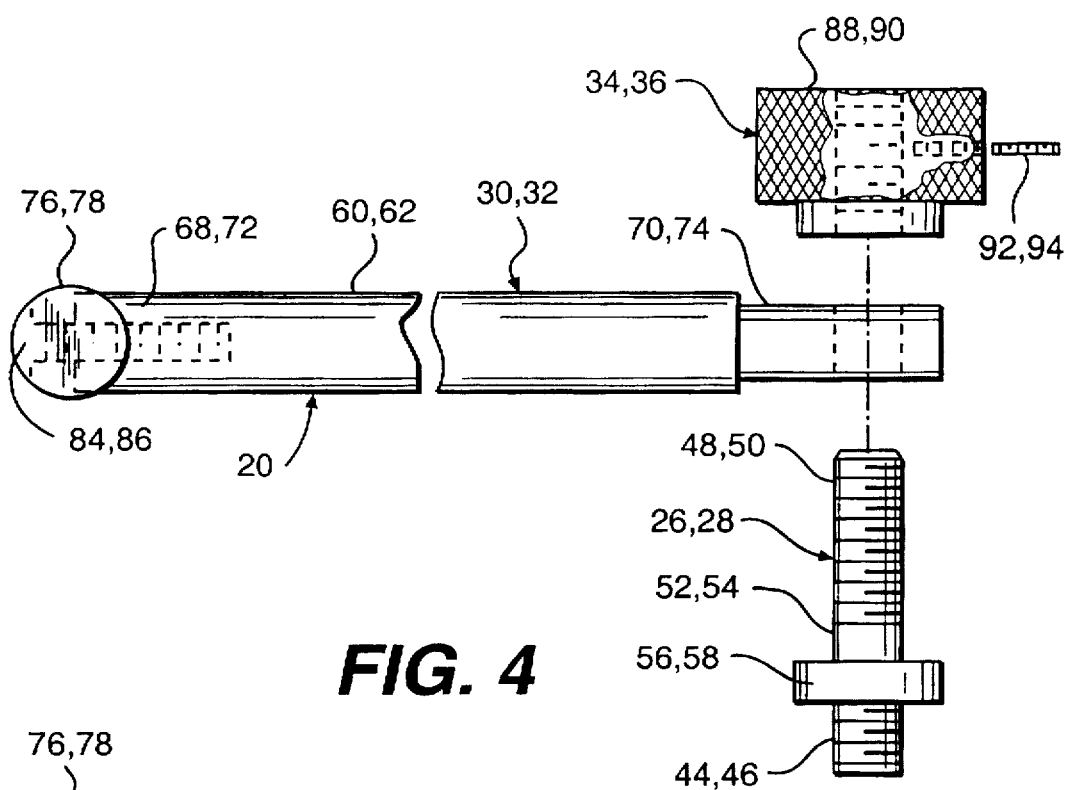
FIG. 4 shows a partially exploded side view of a portion of the invention of FIG. 1.
Figure 5:
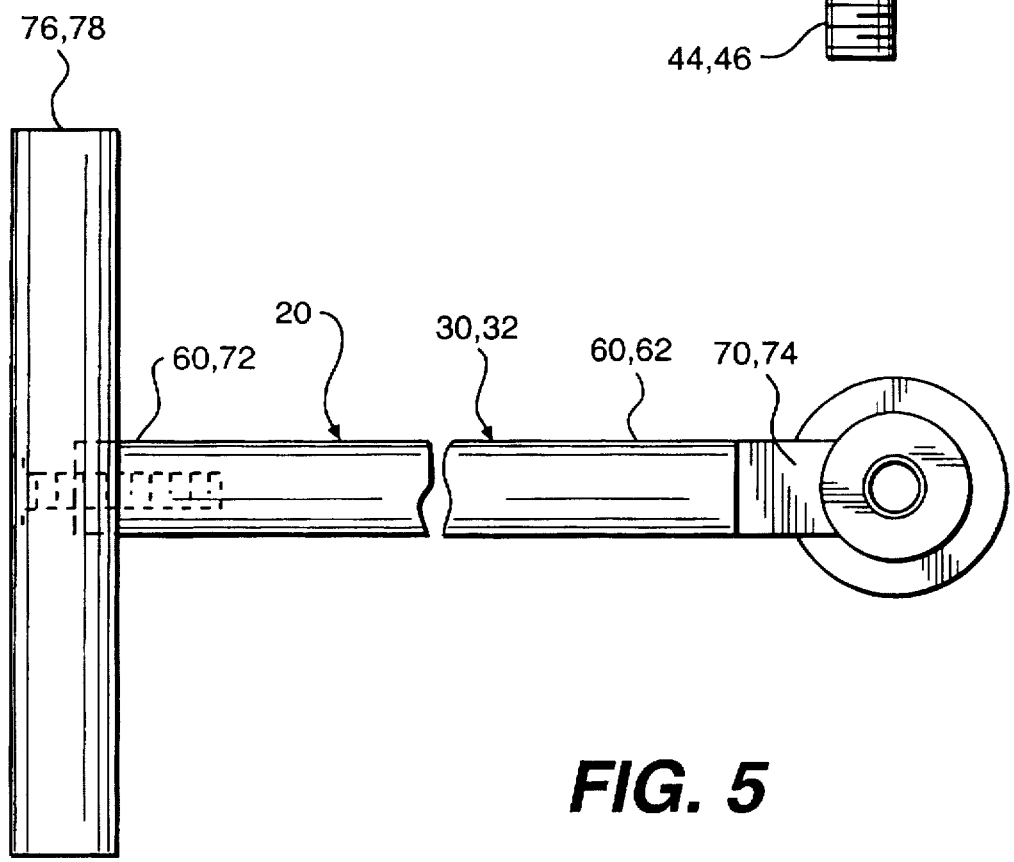
FIG. 5 shows a partially exploded front view of a portion of the invention of FIG. 1.

The present invention comprises a first and a second stud 26, 28, each similar to that as shown in FIGS. 4–5, and each formed from cylindrical stock and made of material that is chosen for its durability, strength and resistance to oxidation such as stainless steel, or aluminum or carbon steel that is anodized, galvanized or chrome-plated after machining. Each stud 26, 28 has four portions: a first portion 44, 46, a second portion 48, 50, a middle portion 52, 54 and a collar 56, 58. The first portion 44 of the first stud 26 has an outside diameter and external threads so as to be threadably attachable to the flywheel side 40 of a crankshaft 38. The first portion 46 of the second stud 28 has an outside diameter and external threads so as to be threadably attachable to the snout side 42 of a crankshaft 38. Additionally, each stud 26, 28 has a middle portion 52, 54 that is smooth, so as to provide a bearing surface for the aforementioned handle assemblies 30, 32.

Between the middle portion 52, 54 and the first portion 44, 46 of each stud 26, 28 is an attached collar 56, 58. This collar 56, 58 may be machined in place or attached after the rest of the stud 26, 28 is fabricated. The collar 56, 58 prevents the stud 26, 28 from over-insertion in the crankshaft 38 and also acts as a barrier for each stud's associated handle assembly 30, 32. The second portion 48, 50 of each stud 26, 28 is designed to assist in retaining the stud's 26, 28 associated handle assembly 30, 32 on the stud 26, 28. In the present embodiment, the second portion 48, 50 of each stud 26, 28 forms an outside diameter and external threads so as to receive the handle assembly retaining means 34, 36.

As shown in FIGS. 1–5, the handle assemblies 30, 32 include: (i) a first rod 60 and a second rod 62, each with a certain length 64, 66, and each with a first end 68, 72 and a second end 70, 74, and (ii) a first handle 76 and a second handle 78, the first handle 76 attached to the first end 68 of the first rod 60, the second handle 78 attached to the first end 72 of the second rod 62. Each rod 60, 62 and handle 76, 78 is made of material chosen for its durability, strength and resistance to oxidation such as stainless steel, or aluminum or carbon steel that is anodized, galvanized or chrome-plated after machining. The overall, pre-fabricated shape of each rod 60, 62 and handle 76, 78 is cylindrical to take advantage of readily available material sizes and maximization of ease of fabrication.

The length of each rod 60, 62 is such that, upon assembly, the handles 76, 78 are capable of lying in a line parallel to a line that would be formed along the center of rotation of the attached crankshaft 38 if the crankshaft 38 were able to rotate as designed in such an environment. This allows an operator of the tool 20 to maneuver an attached crankshaft 38 with hands that are equidistant above the center line of rotation of the crankshaft 38, thus greatly increasing ease of maneuverability.

The second end 70, 74 of each rod 60, 62 forms a hole capable of receiving a stud 26, 28 threadably engaged in a crankshaft 38. As shown in FIG. 3, each rod 60, 62 has its second end 70, 74 milled in two parallel faces to assist in its fabrication and retainability. Additionally, as shown in FIGS. 2–3, the first end 68, 72 of each rod 60, 62 forms a threaded hole along its central axis to assist in the attaching of its associated handle 76, 78.

As shown in FIGS. 4–5, each handle 76, 78 forms a hole that has been drilled perpendicularly across its axis at its midpoint so as to receive a means for attaching 80, 82 each handle 76, 78 to its associated rod 60, 62, such as a machine screw 80, 82. Each handle 76, 78 forms a counterbore at such point to better assist in receiving the head 84, 86 of such a machine screw 80, 82, and similarly, each handle 76, 78 also forms a counterbore at a point opposite the aforementioned counterboring to receive the first end 68, 72 of its associated rod 60, 62. The handle 76, 78 has a friction-increased surface, such as knurling or a polymer covering, so that slipping is reduced.

As shown in FIGS. 1, 4–5, an embodiment of the present invention has a pair of retaining means 34, 36 designed to retain the handle assemblies 30, 32 on the studs 26, 28. Each retaining means 34, 36 is made of the following: (i) a knob 88, 90 having a central axis and a radius, and (ii) a set screw 92, 94. Each knob 88, 90 forms a threaded hole along its central axis to receive the second portion 48, 50 of its associated stud 26, 28. Each knob 88, 90 also forms a threaded hole along its radius adequate to receive a set screw 92, 94. When a knob 88, 90 is threadably attached to its associated stud 26, 28 and a set screw 92,94 is threadably attached to the knob 88, 90, the knob 88, 90 is prevented from being removed from the stud 26, 28.

Each knob 88, 90 is made of material chosen for its durability, strength and resistance to oxidation, such as stainless steel, or aluminum or carbon steel that is anodized, galvanized or chrome-plated after machining. The overall, pre-fabricated shape of each knob 88, 90 is cylindrical to take advantage of readily available material sizes and maximization of ease of fabrication. Each retaining means 34, 36 has a friction-increased surface, such as angled facing, knurling or a polymer covering, so that slipping is reduced.

In use, the first stud 26 is threadably engaged in the flywheel end 40 of the crankshaft 38 and the second stud 28 is threadably engaged in the snout end 42 of the crankshaft 38. The first handle assembly 30 is formed by having the first end 68 of the first rod 60 attached by screw 80 to the first handle 76. The second handle assembly 32 is formed by having the first end 72 of the second rod 62 attached by screw 82 to the second handle 78. The second end 70 of the first rod 60 is placed over the first stud 26, up to its collar 56. The second end 74 of the second rod 62 is placed over the second stud 28, up to its collar 58. The first retaining means 34 is then threadably attached to the first stud 26 and its set screw 92 is threadably attached thereto. The second retaining means 36 is then threadably attached to the second stud 28 and its set screw 94 is threadably attached thereto. By use of the tool 20 in such a manner, the crankshaft 38 may be maneuvered, manipulated, installed or removed.

As shown and described herein, the tool 20 comprises a pair of devices 22, 24 for use in conjunction with a crankshaft 38. However, components of these devices may also be provided in a kit so as to allow for the servicing of one or a variety of crankshafts. In one embodiment, such a kit comprises attaching means and a variety of studs that are compatible with the threaded holes of the flywheel ends and the snout ends of a multiplicity of crankshafts. Such a kit also comprises rods having a variety of lengths such that, for a multiplicity of crankshafts, handles attached to such rods are capable of lying in a line parallel to a line that would be formed along the center of rotation of said multiplicity of crankshafts.

The previously described versions of the present invention have many advantages, including the provision of a device in the form of a tool suitable for the installation, removal and carrying of a crankshaft. Further, the present invention provides a device suitable for the manipulation of an automotive crankshaft while placed within an engine block. Still further, the present invention provides a crankshaft tool that can be used by one person in a variety of applications. Still further, the present invention provides a crankshaft tool that is easy to manufacture out of high quality materials and allows for a relatively inexpensive end product. Still further, the present invention to provides a crankshaft tool in kit form.

Although the present invention has been described in considerable detail with reference to certain preferred versions thereof, other versions are possible. For example, the entire tool may be anodized, galvanized or chrome plated after fabrication to prevent oxidation and wear. Also, each retaining means 34, 36 may be any one of a host of retaining devices, including: cotter pins, nuts, clamps, latches, caps or snaps. Therefore, the spirit and scope of the appended claims should not be limited to the description of the preferred versions herein.

What is claimed is:

1. A crankshaft manipulation toolkit comprising:
   a. a plurality of studs capable of being threadably engaged in a crankshaft;
   b. a plurality of rods each having a certain length and a first end and a second end, the second end of each rod forming a hole through which a stud may be placed;
   c. a plurality of knobs, each forming internal, threaded bores in a manner such that said knobs may be threadably attached to said studs and capable of retaining said rods between said knobs and said crankshaft; each of said knobs also forming threaded holes in a manner so as to receive set screws capable of retaining said studs within said knobs;
   d. a plurality of set screws threadably attachable to said knobs capable of retaining said rods within said knobs; and
   e. a plurality of handles, attached to said first ends of said rods.

2. A crankshaft manipulation toolkit as recited in claim 1, wherein each of the studs further comprises a middle portion having a smooth surface capable of bearing said first ends of said rods.

3. A crankshaft manipulation toolkit as recited in claim 2, wherein the studs have a portion capable of being threadably engaged in a crankshaft and the toolkit further comprises a retaining collar attached to each of the studs between the middle portion and the portion of the stud capable of being threadably engaged in a crankshaft.

4. A crankshaft manipulation toolkit as recited in claim 1 wherein the length of the rods allows, upon assembly of the kit, for the first ends of the rods to be equidistant from an axis of rotation of the crankshaft.

5. A crankshaft manipulation toolkit as recited in claim 1 wherein the knobs are knurled.

6. A crankshaft manipulation tool comprising:
   a. a first handle and a second handle;
   b. a first rod and a second rod, each rod having a certain length and a first end and a second end, the first end of each rod attached to a handle, the second end of each rod forming a hole;
   c. a first stud and a second stud, each stud with a middle portion, a first end and a second end, the first end of each stud capable of being threadably engaged in a crankshaft, said first stud insertable and confinable in the second end of said first rod, said second stud insertable and confinable in the second end of said second rod;
   d. a retaining collar attached to each stud between the middle portion and the first end;
   e. a first knob and a second knob, each knob having a center and a radius, each knob forming a threaded bore through its center and each knob forming a set screw receptacle along its radius, said first knob threadably attached to said second end of said first stud, said second knob threadably attached to said second end of said second stud; and
   f. a first set screw and a second set screw, the first set screw threadably engaged in the set screw receptacle of the first knob and the second set screw threadably engaged in the set screw receptacle of the second knob.

7. A crankshaft manipulation tool as recited in claim 6 wherein the length of the rods is such that upon assembly, the first ends of the rods are equidistant from an axis of rotation of the crankshaft.

8. A crankshaft manipulation tool as recited in claim 6 wherein the knobs are knurled.

9. A crankshaft manipulation tool comprising:
   a. a means for engaging said crankshaft; and
   b. a means for removably gripping said engaging means.

10. A crankshaft manipulation tool as recited in claim 9 wherein said removable gripping means comprises:
    a. a plurality of handle assemblies capable of being placed on said engaging means; and
    b. a plurality of means for removably retaining said handle assemblies on said engaging means.

11. A crankshaft manipulation tool as recited in claim 10 wherein each of said handle assemblies comprises:
    a. a rod;
    b. a handle attached to said rod.

12. A crankshaft manipulation tool as recited in claim 11 wherein the length of each of said rods is such that upon assembly, the first ends of the rods are equidistant from an axis of rotation of the crankshaft.

13. A crankshaft manipulation tool as recited in claim 12 wherein each of said removable retaining means comprises a fastener forming an internal, threaded hole capable of receiving a stud.

14. A crankshaft manipulation tool as recited in claim 13 wherein each of said removable retaining means comprises:
    a. a knob with an axis and a radius, said knob forming a threaded hole along its axis capable of receiving a stud and said knob also forming a threaded hole along its radius capable of receiving a set screw; and
    b. a set screw threadably engagable within said knob.

15. A crankshaft manipulation tool as recited in claim 14 wherein each of said knobs is knurled.

16. A crankshaft manipulation tool as recited in claim 9 wherein said engaging means comprises a plurality of threaded studs having a first end and a middle.

17. A crankshaft manipulation tool as recited in claim 16 wherein the middle of each of said threaded studs is smooth.

18. A crankshaft manipulation tool as recited in claim 17 wherein each of said studs further comprises a retaining collar located between the first end and the middle.

19. A crankshaft manipulation tool comprising:
a. an engager for engaging said crankshaft; and
b. a gripper for removably gripping said engager, the gripper comprising:
   i. a plurality of handle assemblies capable of being placed on said engager, said handle assemblies each comprising:
      (1) a rod having length, a first end for receiving a handle and a second end for receiving an engager, such that upon assembly each first end of each rod is equidistant from an axis of rotation of the crankshaft, and
      (2) a handle attached to said first end of said rod; and
   ii. a plurality of retainers for removably retaining said handle assemblies on said engagers, each retainer comprising a fastener forming an internal, threaded hole capable of receiving a stud, each fastener comprising:
      (1) a knob with an axis and a radius, said knob forming a threaded hole along its axis capable of receiving a stud and said knob also forming a threaded hole along its radius capable of receiving a set screw, and
      (2) a set screw threadably engagable within said knob.

20. A crankshaft manipulation tool as recited in claim 19 wherein each of said knobs is knurled.

* * * * *